(12) United States Patent
Yeh (10) Patent No.: US 10,324,894 B2
(45) Date of Patent: Jun. 18, 2019

(54) STORAGE DEVICE MANAGEMENT METHOD AND SYSTEM, AND MEMORY STORAGE DEVICE THEREOF

(71) Applicant: PHISON ELECTRONICS CORP., Miaoli (TW)

(72) Inventor: Jen-Feng Yeh, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 950 days.

(21) Appl. No.: 14/723,466

(22) Filed: May 28, 2015

(65) Prior Publication Data

US 2016/0283510 A1  Sep. 29, 2016

(30) Foreign Application Priority Data

Mar. 24, 2015 (TW) .............................. 104109359 A (51) Int. Cl.
*G06F 16/30* (2019.01)
*G06F 16/13* (2019.01)
*G06F 3/06* (2006.01)

(52) U.S. Cl.
CPC .............. *G06F 16/13* (2019.01); *G06F 3/062* (2013.01); *G06F 3/0638* (2013.01); *G06F 3/0643* (2013.01); *G06F 3/0679* (2013.01)

(58) Field of Classification Search
CPC .................................................. G06F 17/30091
USPC .......................................................... 707/737
See application file for complete search history.

(56) References Cited

U.S. PATENT DOCUMENTS

| 2003/0081938 A1* | 5/2003 | Nishimura | G11B 27/034 386/279 |
| 2011/0239306 A1* | 9/2011 | Avni | G06F 21/54 726/26 |
| 2012/0284587 A1* | 11/2012 | Yu | G06F 3/0608 714/773 |
| 2014/0156913 A1* | 6/2014 | Chiang | G06F 12/0246 711/103 |

* cited by examiner

*Primary Examiner* — Mahesh H Dwivedi
*Assistant Examiner* — Johnese T Johnson
(74) *Attorney, Agent, or Firm* — JCIPRNET (57) ABSTRACT

A storage device management method, a storage device management system and a memory storage device are provided. The method includes establishing multiple first temporary files in a first directory before receiving a setting instruction from a host, wherein the first temporary files are stored in multiple consecutive clusters of a file system and an operating system of the host is unable to access files in the first directory. The method further includes receiving the setting instruction from the host, wherein the setting instruction instructs to configure a temporary file directory in a second directory and the operating system of the host is able to access files in the second directory. The method further includes linking a cluster number of the consecutive clusters storing the first temporary files to the temporary file directory in the directory area corresponding to the file system.

24 Claims, 9 Drawing Sheets

STORAGE DEVICE MANAGEMENT METHOD AND SYSTEM, AND MEMORY STORAGE DEVICE THEREOF

CROSS-REFERENCE TO RELATED APPLICATION

This application claims the priority benefit of Taiwan application serial no. 104109359, filed on Mar. 24, 2015. The entirety of the above-mentioned patent application is hereby incorporated by reference herein and made a part of this specification.

BACKGROUND

Technical Field

The present disclosure relates to a storage device management method, and more particularly, to a storage device management method for a memory storage device having a rewritable non-volatile memory module and a smart card chip, and a storage device management system using the method and a memory storage device thereof.

Description of Related Art

The user's increasing acceptance of electronic wallet and pre-deposit lead to the popularity of smart cards. A smart card is typically an integrated circuit (IC) chip which includes, for example, a microprocessor, a card operation system, a security module, and a memory module to allow holder of the smart card to perform preset operations. With the ability to provide computation, encryption, bidirectional communication and security functions, the smart card not only stores data but also protects the data stored therein. One exemplary application of the smart card is the subscriber identification module (SIM) of cellular phones that use global system for mobile communication (GSM). However, the smart card has a limit on the storage capacity. Thus, the smart card has recently begun to be combined with a large storage memory card to expand the storage capacity of the smart card.

Generally, data is transmitted between a host system and the smart card by accessing a temporary file associated with the smart card. However, a data accessing method proposed by Google for Android 4.4.2 version only allows an application of the user to perform data accessing in particular directories. Therefore, it is possible that the application of the user is unable to perform data writing for specific temporary files due to insufficient permissions. Moreover, although aforesaid issue may be solved by dynamically establishing the temporary file in the host system, the memory device may not be able to completely record the logical address of said dynamic temporary file when a logical address (LA) of one specific dynamic temporary file is fractured or discontinuous, or the data may be incorrectly accessed when the writing operation is performed across multiple logical addresses.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present disclosure is directed to a storage device management method, a memory storage device and a storage device management system, which are capable of correctly accessing a smart card chip by accessing a logical address of a temporary file.

The present disclosure provides a storage device management method for a memory storage device having a rewritable non-volatile memory module and a smart card chip. The storage device management method includes establishing multiple first temporary files in a first directory before receiving a setting instruction from a host, wherein the first temporary files are stored in a plurality of consecutive clusters of a file system corresponding to the memory storage device, and the first directory is configured in the rewritable non-volatile memory module and an operating system of the host is unable to access files in the first directory. The storage device management method further includes receiving the setting instruction from the host, wherein the setting instruction instructs to configure a temporary file directory in a second directory, and the second directory is configured in the rewritable non-volatile memory module and the operating system of the host is able to access files in the second directory. The storage device management method further includes linking a cluster number of the consecutive clusters storing the first temporary files to the temporary file directory in the directory area corresponding to the file system.

The present disclosure provides a memory storage device, which includes a connection interface unit configured to couple to a host, a rewritable non-volatile memory module, a smart card chip and a memory control circuit unit. The memory control circuit unit is coupled to the connection interface unit, the rewritable non-volatile memory module and the smart card chip. The memory control circuit unit establishes a plurality of first temporary files in a first directory before receiving a setting instruction from the host. The first temporary files are stored in a plurality of consecutive clusters of a file system corresponding to the memory storage device, and the first directory is configured in the rewritable non-volatile memory module and an operating system of the host is unable to access files in the first directory. The setting instruction instructs to configure a temporary file directory in a second directory, and the second directory is configured in the rewritable non-volatile memory module and the operating system of the host is able to access files in the second directory. The memory control circuit unit links a cluster number of the consecutive clusters storing the first temporary files to the temporary file directory in the directory area corresponding to the file system.

The present disclosure provides a storage device management system, which includes a host and a memory storage device. The memory storage device has a rewritable non-volatile memory module and a smart card chip, and is detachably coupled to the host. The memory storage device establishes a plurality of first temporary files in a first directory before receiving a setting instruction from the host. The first temporary files are stored in a plurality of consecutive clusters of a file system corresponding to the memory storage device, and the first directory is configured in the rewritable non-volatile memory module and an operating system of the host is unable to access files in the first directory. The setting instruction instructs to configure a temporary file directory in a second directory, and the second directory is configured in the rewritable non-volatile memory module and the operating system of the host is able to access files in the second directory. The memory storage device links a cluster number of the consecutive clusters storing the first temporary files to the temporary file directory in the directory area corresponding to the file system.

Based on the above, the host is able to correctly access the smart card chip when accessing the logical addresses of the first temporary files by linking the cluster number of the consecutive clusters of the first temporary files to the second directory which is accessible to the host. As such, even when the host accesses the data greater than the size of the clusters, because the clusters of first temporary files are consecutive, the issue where the data being incorrectly accessed may be prevented.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host so that the host may write data to or read data from the memory storage device.

Figure 1:
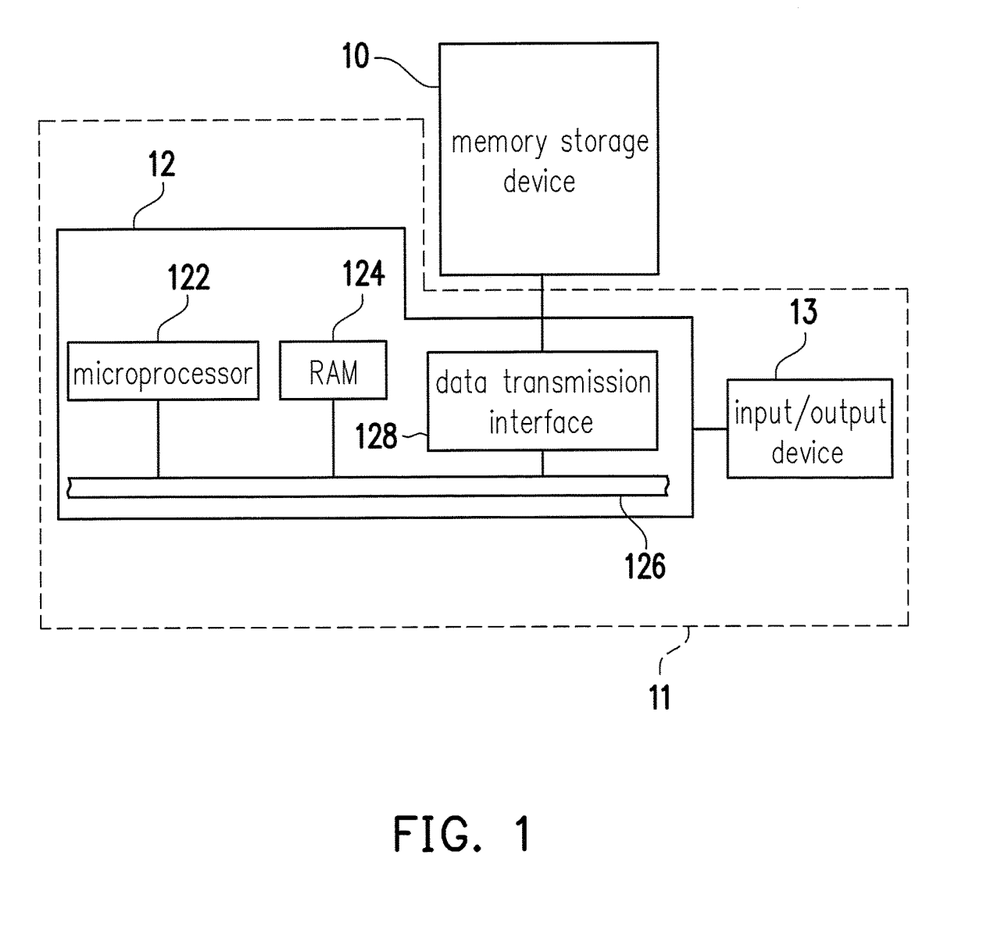
FIG. 1 is a schematic diagram illustrating a host and a memory storage device according to an exemplary embodiment.
Figure 2:
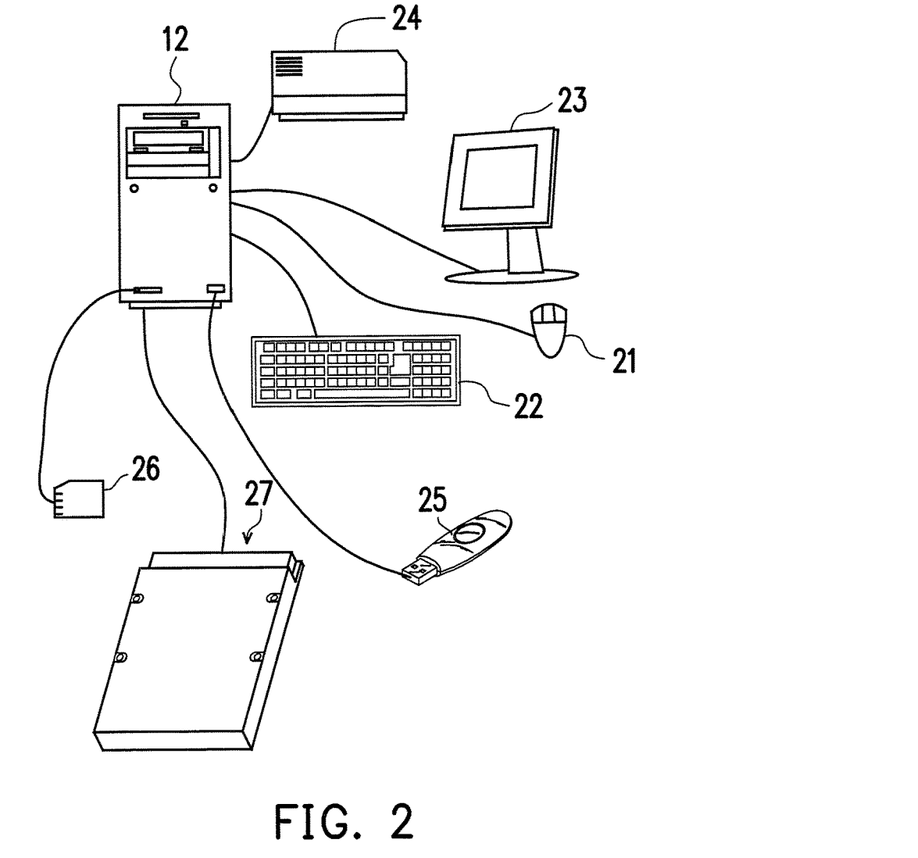
FIG. 2 is a schematic diagram of a computer, an input/output device, and a memory storage device according to an exemplary embodiment.

FIG. 1 is a schematic diagram illustrating a host and a memory storage device according to an exemplary embodiment, and FIG. 2 is a schematic diagram of a computer, an input/output device, and a memory storage device according to an exemplary embodiment.

Referring to FIG. 1, a host 11 includes a computer 12 and an input/output (I/O) device 13. The computer 12 includes a microprocessor 122, a random access memory (RAM) 124, a system bus 126, and a data transmission interface 128. For example, the I/O device 13 includes a mouse 21, a keyboard 22, a display 23 and a printer 24 as shown in FIG. 2. It should be understood that the devices illustrated in FIG. 2 are not intended to limit the I/O device 13, and the I/O device 13 may further include other devices.

In the present embodiment, the memory storage device 10 is electrically connected to other devices of the host 11 through the data transmission interface 128. By using the microprocessor 122, the RAM 124 and the I/O device 13, data may be written into the memory storage apparatus 10 or may be read from the memory storage device 10. For example, the memory storage device 10 may be a rewritable non-volatile memory storage device such as a flash drive 25, a memory card 26, or a solid state drive (SSD) 27 as shown in FIG. 2.

Figure 3:
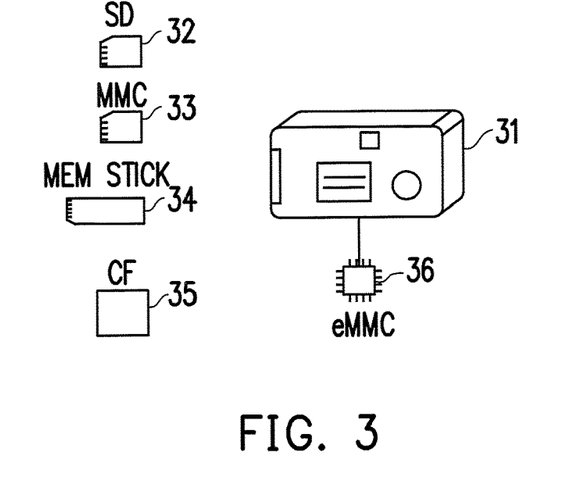
FIG. 3 is a schematic diagram illustrating a host and a memory storage device according to an exemplary embodiment.

FIG. 3 is a schematic diagram illustrating a host and a memory storage device according to an exemplary embodiment.

Generally, the host 11 may substantially be any system capable of storing data with the memory storage device 10. In the present exemplary embodiment, the host 11 is illustrated as a computer system. However, in another exemplary embodiment, the host 11 may be a system such as a digital camera, a video camera, a telecommunication device, an audio player, or a video player. For example, when the host is a digital camera (video camera) 31 in FIG. 3, the rewritable non-volatile memory storage device may be a SD card 32, a MMC card 33, a memory stick 34, a CF card 35 or an embedded storage device 36 (as shown in FIG. 3). The embedded storage device 36 includes an embedded MMC (eMMC). It is worth mentioning that the eMMC is electrically connected to a substrate of the host, directly.

Figure 4:
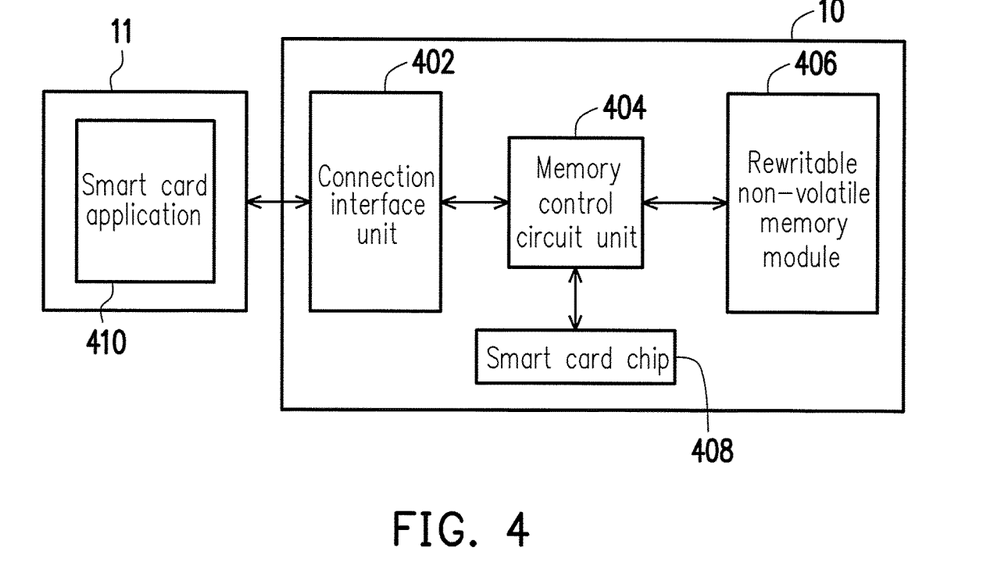
FIG. 4 is a schematic block diagram illustrating a host and a memory storage device according to an exemplary embodiment.

FIG. 4 is a schematic block diagram illustrating a host and a memory storage device according to an exemplary embodiment.

Referring to FIG. 4, the memory storage device 10 includes a connection interface unit 402, a memory control circuit unit 404, a rewritable non-volatile memory module 406 and a smart card chip 408.

In the present exemplary embodiment, the memory control circuit unit 404 is configured to control overall operations of the memory storage device 10 in order to complete a storage device management method according to the embodiments of the invention. Further, it should be understood that the host 11 also includes general functions required for connecting to the memory storage device 10.

The connection interface unit 402 is compatible with a serial advanced technology attachment (SATA) standard. However, the invention is not limited thereto, and the connection interface unit 402 may also be compatible with Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connection interface unit 402 and the memory control circuit unit 404 may be packaged into one chip, or distributed outside of a chip containing the memory control circuit unit 404.

The memory control circuit unit 404 is configured to execute a plurality of logic gates or control commands which are implemented in a hardware form or in a firmware form, so as to perform operations of writing, reading, erasing and merging data in the rewritable non-volatile memory module 406 and the smart card chip 408 according to the commands of the host 11.

The rewritable non-volatile memory module 406 is coupled to the memory control circuit unit 404 and configured to store data written from the host 11. The rewritable non-volatile memory module 406 may be a Single Level Cell (SLC) NAND flash memory module (i.e., a flash memory module capable of storing one bit data in one memory cell), a Multi Level Cell (MLC) NAND flash memory module (i.e., a flash memory module capable of storing two bit data in one memory cell), a Triple Level Cell (TLC) NAND flash memory module (i.e., a flash memory module capable of storing three bit data in one memory cell), other flash memory modules or any memory module having the same features.

The smart card chip 408 is coupled to the memory control circuit unit 404 for performing functions such as computation, encryption, bidirectional communication, and security verification. In an exemplary embodiment, the smart card chip 408 is a contact type smart card compatible with the ISO 7816 standard. Nevertheless, it should be understood that the invention is not limited thereto. For example, the smart card chip 408 may also be a contact or non-contact type smart card compatible with ISO 14443, ISO 15408 or other smart card standards. As another example, the smart card chip 408 may be a radio frequency identification (RFID) chip, a wireless transmission chip (e.g., bluetooth chip), or a multimedia control chip (e.g., digital recording chip). In addition, it should be noted that, the memory control circuit unit 404 and the smart card chip 408 can each be an independent chip or can be integrated and packaged into a single chip. In the present exemplary embodiment, the smart card chip 408 is configured to store sensitive data related to safety verification, such as an encryption/decryption key, an account name and/or a password. However, in another exemplary embodiment, the smart card chip 408 may also be configured to store general data.

Figure 5:
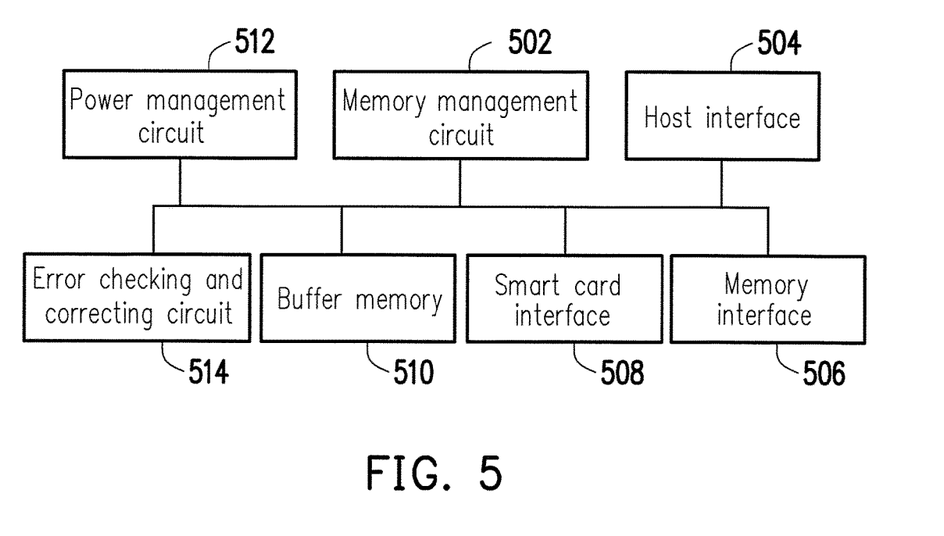
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504, a memory interface 506 and a smart card interface 508.

The memory management circuit 502 is configured to control overall operations of the memory control circuit unit 404. Specifically, the memory management circuit 502 has a plurality of control commands. During operations of the memory storage device 10, the control commands are executed to execute various operations such as writing, reading and erasing data. Operations of the memory management circuit 502 are similar to the operations of the memory control circuit unit 404.

In the present exemplary embodiment, the control commands of the memory management circuit 502 are implemented in a form of a firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data for the rewritable non-volatile memory module 406. In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). Particularly, the read only memory has an activate code, which is executed by the microprocessor unit to load the control commands stored in the rewritable non-volatile memory module 406 to the random access memory of the memory management circuit 502 when the memory control circuit unit 404 is enabled. Thereafter, the control commands are executed by the microprocessor unit to execute operations of writing, reading or erasing data.

The host interface 504 is coupled to the memory management circuit 502 and configured to couple to the connection interface unit 402, so as to receive and identify commands and data transmitted from the host 11. In other words, the commands and data transmitted from the host 11 are passed to the memory management circuit 502 through the host interface 504. In the present exemplary embodiment, the host interface 504 is compatible with the SATA standard. However, it should be understood that the invention is not limited thereto, and the host interface 504 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 506 is coupled to the memory management circuit 502 and configured to access the rewritable non-volatile memory module 406. That is, data to be written into the rewritable non-volatile memory module 406 is converted into a format acceptable to the rewritable non-volatile memory module 406 by the memory interface 506. For example, if the memory management circuit 502 intends to access the rewritable non-volatile memory module 406, the memory interface 506 transmits corresponding command sequences. The command sequences may include one or more signals, or data from the bus. For example, in a read command sequence, information such as identification codes and memory addresses are included.

The smart card interface 508 is coupled to the memory management circuit 502 and coupled to the smart card chip 408. Specifically, the memory management circuit 502 may transmit commands to the smart card chip 408 or receive responds from the smart card chip 408 through the smart card interface 508. For example, in the present exemplary embodiment, a command data unit transmitted to the smart card chip 408 is known as a command-application protocol data unit (C-APDU) and a respond data unit from the smart card chip 108 is known as a response-application protocol data unit (R-APDU).

In an exemplary embodiment, the memory control circuit unit 404 further includes a buffer memory 510, a power management circuit 512 and an error checking and correcting circuit 514.

The buffer memory 510 is coupled to the memory management circuit 502 and configured to temporarily store data and commands from the host 11 or data from the rewritable non-volatile memory module 406 or the smart card chip 408.

The power management unit 512 is coupled to the memory management circuit 502 and configured to control a power of the memory storage device 10.

The error checking and correcting circuit 514 is coupled to the memory management circuit 502 and configured to execute an error checking and correcting process to ensure the correctness of data. Specifically, when the memory management circuit 502 receives a write command from the host 11, the error checking and correcting circuit 514 generates an error checking and correcting code (ECC code) and/or an error detecting code (EDC) for data corresponding to the write command, and the memory management circuit 502 writes data and the ECC code and/or the EDC corresponding to the write command into the rewritable non-volatile memory module 406. Subsequently, when the memory management circuit 502 reads the data from the rewritable non-volatile memory module 406, the corresponding ECC code and/or the EDC are also read, and the error checking and correcting circuit 514 executes the error checking and correcting procedure on the read data based on the ECC code and/or the EDC.

Figure 6:
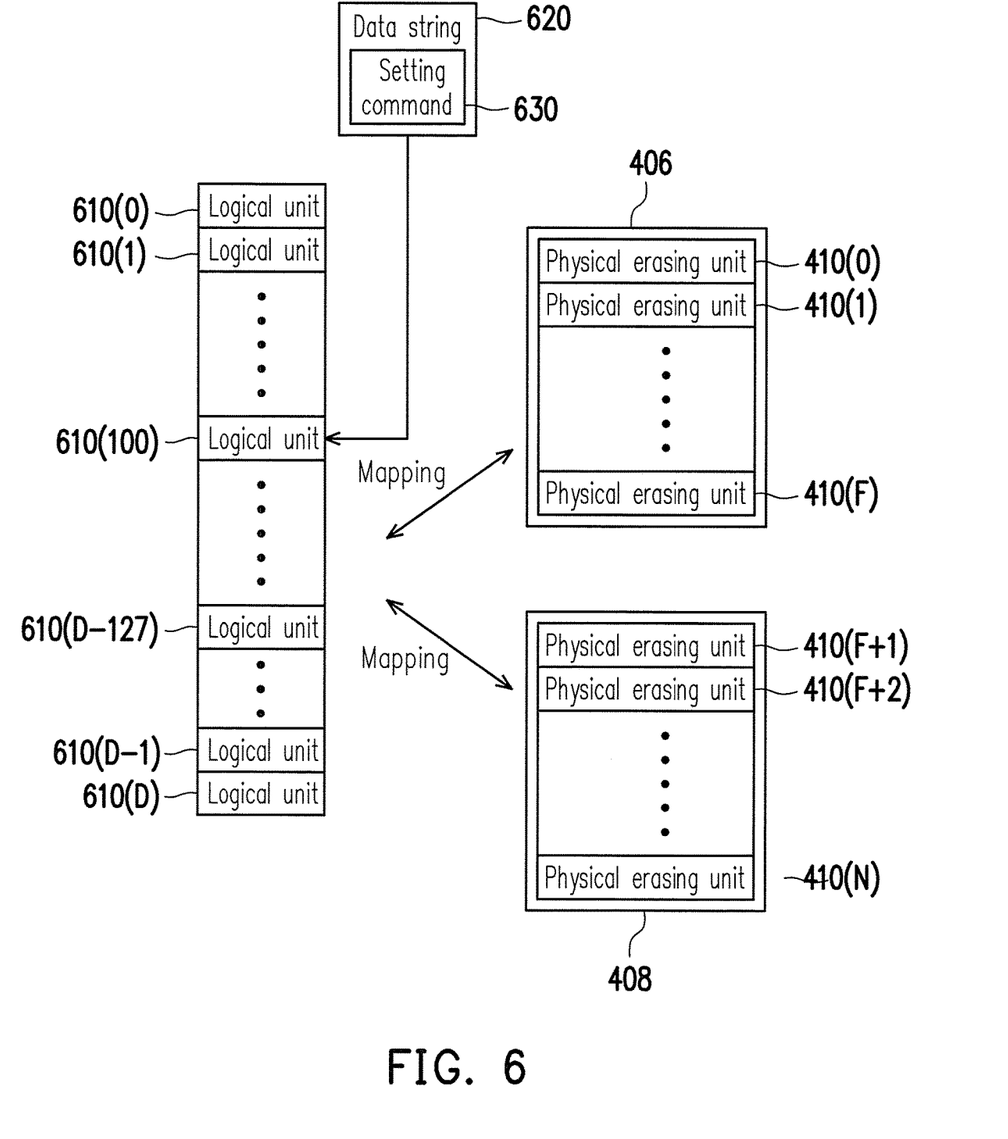
FIG. 6 is a schematic diagram illustrating a management of physical erasing units according to an exemplary embodiment.

FIG. 6 is a schematic diagram illustrating a management of physical erasing units according to an exemplary embodiment.

It should be understood that terms, such as "select," "group," "divide," "associate" and so forth, are logical concepts for describing operations in the physical erasing units. In other words, actual positions of the physical erasing units in the smart card chip 408 and the rewritable non-volatile memory module 406 are not changed, and instead, these physical erasing units are logically operated.

Referring to FIG. 6, the rewritable non-volatile memory module 406 has physical erasing units 410(1)~410(F) and the smart card chip 408 has physical erasing units 410(F+1)~410(N). The physical erasing units 410(0) to 410(F) may belong to the same memory die or belong to different memory dies. The physical erasing units 410(F+1)~410(N) may also belong to the same memory die or belong to different memory dies. Each physical erasing unit has a plurality of physical programming units, and the physical programming units of the same physical erasing unit may be written separately and erased simultaneously.

In the present exemplary embodiment, the physical programming unit is a minimum unit for programming. That is, the programming unit is the minimum unit for writing data. For example, the physical programming unit is a physical page or a physical sector. When the physical programming unit is the physical page, each physical programming unit usually includes a data bit area and a redundancy bit area. The data bit area has multiple physical sectors configured to store user data, and the redundant bit area is configured to store system data (e.g., an error correcting code). In the present exemplary embodiment, one data bit area contains 32 physical sectors, and a size of one physical sector is 512 byte (B). However, in other exemplary embodiments, the data bit area may also include 8, 16, or more or less of the physical sectors. On the other hand, the physical erasing unit is the minimal unit for erasing. Namely, each physical erasing unit contains the least number of memory cells to be erased together. For instance, the physical erasing unit is a physical block. In addition, in another exemplary embodiment, the smart card chip 408 may also include other storage mediums rather than only use the physical erasing units to store the data.

The memory management circuit 502 may also be configured with logical units 610(0)~610(D) for mapping at least part of the physical erasing units 410(0) to 410(N). For example, in the present exemplary embodiment, the host 11 accesses the data stored in the physical erasing units 410(0) to 410(N) through a logical block address (LBA). Therefore, each of the logical units 610(0)~610(D) refers to one logical block address. In another exemplary embodiment, the size of one logical unit is equal to the size of one logical sector. For example, the size of one logical sector is 512 KB. However, in another exemplary embodiment, the size of one logical unit may be greater or smaller, and each of the logical units 610(0)~610(D) may also refer to one logical programming unit, one logical erasing unit and a composition of a plurality of consecutive logical block addresses. Each of the logical units 610(0)~610(D) maps to one or more physical units. In the present exemplary embodiment, one physical unit refers to one physical sector. However, in another exemplary embodiment, one physical unit may also be one physical address, one physical programming unit, one physical erasing unit or a composition of a plurality of consecutive physical addresses, which are not particularly limited in the present invention. The memory management circuit 502 may record mapping relations between the logical units and the physical units into one or more logical-to-physical mapping tables. When the host 11 intends to read the data from the memory storage device 10 or write the data into the memory storage device 10, the memory management circuit 502 may access the data in the memory storage device 10 according to said one or more logical-to-physical mapping tables.

In the present exemplary embodiment, one or more smart card applications 410 are executed by the host 11. The host 11 (or the smart card application 410) may access the smart card chip 408 to obtain the data required for operations. For example, the smart card application 410 may be applications in various types, such as an instant messaging application, a SMS application, a calling application or a safety verification application, but the types of the smart card application 410 are not limited to the above. For example, the host 11 also executes an operating system (OS) and executes the smart card application 410 based on the operating system.

The operating system may be, for example, Android 4.4.2 or operating system of other types/versions.

In the present exemplary embodiment, the host 11 (or the smart card application 410) communicates with the smart card chip 408 by issuing an access command for one or more temporary files. For example, the host 11 (or the smart card application 410) establishes one or more temporary files in the smart card chip 408, and transfers information related to the logical block addresses occupied by the temporary files to the memory control circuit unit 404 (or the memory management circuit 502). Thereafter, when the host 11 transmits a data string to the storage device 10, the memory control circuit unit 404 (or the memory management circuit 502) determines whether the data string transmitted from the host 11 is to be written to the logical block address occupied by the temporary files. If the data string is to be written to the logical block addresses occupied by the temporary files, the memory control circuit unit 404 (or the memory management circuit 502) identifies the data string as a communication data unit for the smart card chip 408 and transmitted the data string to the smart card chip 408.

Figure 7:
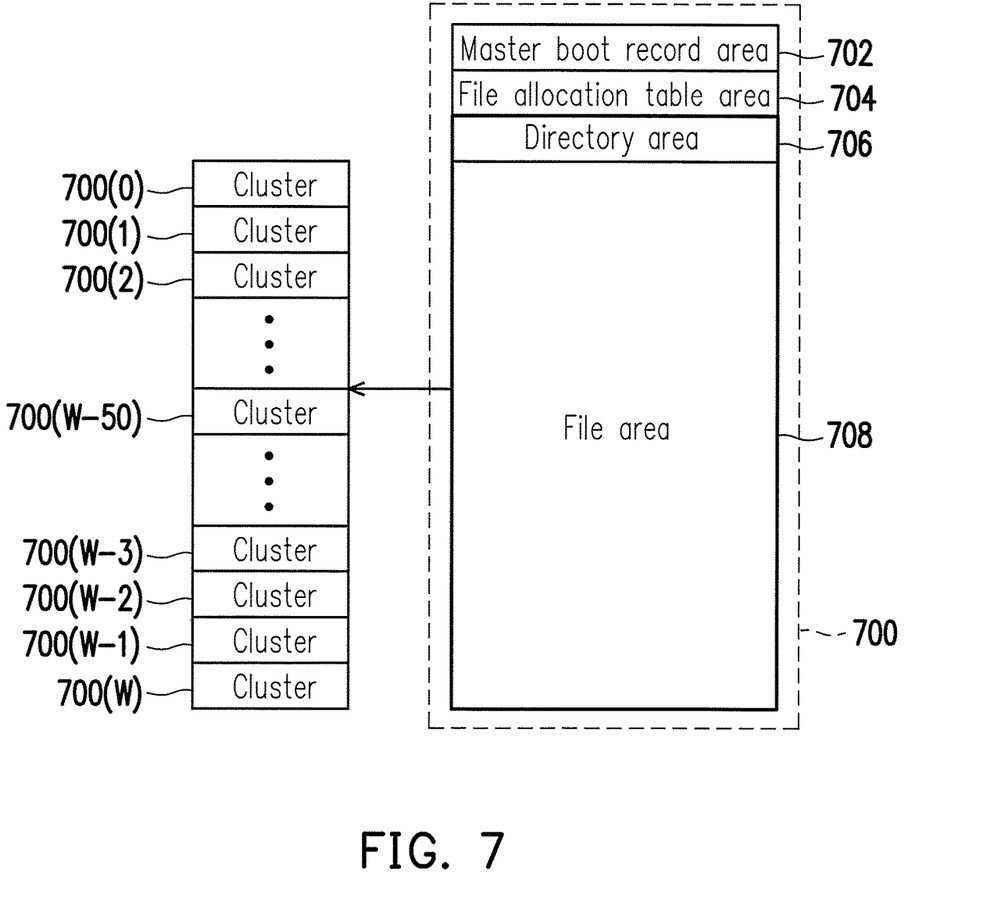
FIG. 7 illustrates an example of the logical address of the memory module formatted by a file system according to an exemplary embodiment.

FIG. 7 illustrates an example of the logical address of the memory module formatted by a file system according to an exemplary embodiment.

Referring to FIG. 7, the operating system of the host 11 may use the file system to format logical addresses of the logical units 610(0)~610(D) into one partition 700. The partition 700 includes a master boot record (MBR) area 702, a file allocation table area 704, a directory area 706 and a file area 708.

The logical addresses belonging to the master boot record area 702 are configured to store system information of a storage space of a portable memory storage device 100. The logical addresses belonging to the file allocation table area 704 are configured to store a file allocation table. The file allocation table is configured to store registry values of the logical addresses for storing files. For example, two file allocation tables are stored in the file allocation table area, wherein one file allocation table is used for normal accessing, whereas another file allocation table is a backup file allocation table. The logical addresses belonging to the directory area 706 are configured to store a file description block (FDB), which is configured to record property information of the files and the directories currently stored in the portable memory storage device 100. In particular, the file description block records a starting logical address (i.e., a starting cluster) for storing the files. The logical addresses belonging to the file area 708 are configured to actually store contents of the files. In the present exemplary embodiment, the partition 700 may be a partition compatible with the FAT32 specification. Therefore, the sectors belonging to the directory area 706 and the file area 708 are grouped into clusters 600(0)~600(W). In the present exemplary embodiment, a size of each of the clusters 600(0)~600(W) may be 16 KB, but the present disclosure is not limited thereto. In other exemplary embodiments, the size of each of the clusters 600(0)~600(W) may also be 8 KB, 32 KB or other sizes.

Figure 8:
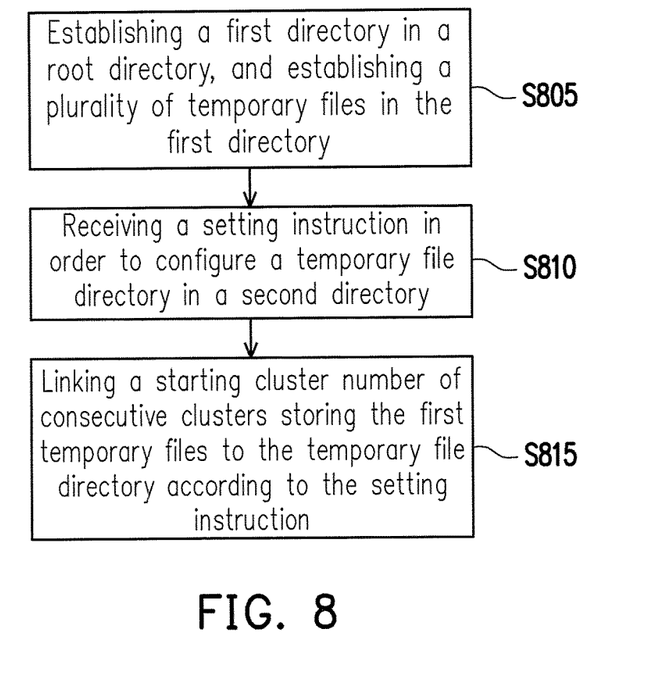
FIG. 8 is a flowchart illustrating a storage device management method according to an exemplary embodiment.
Figure 9A:
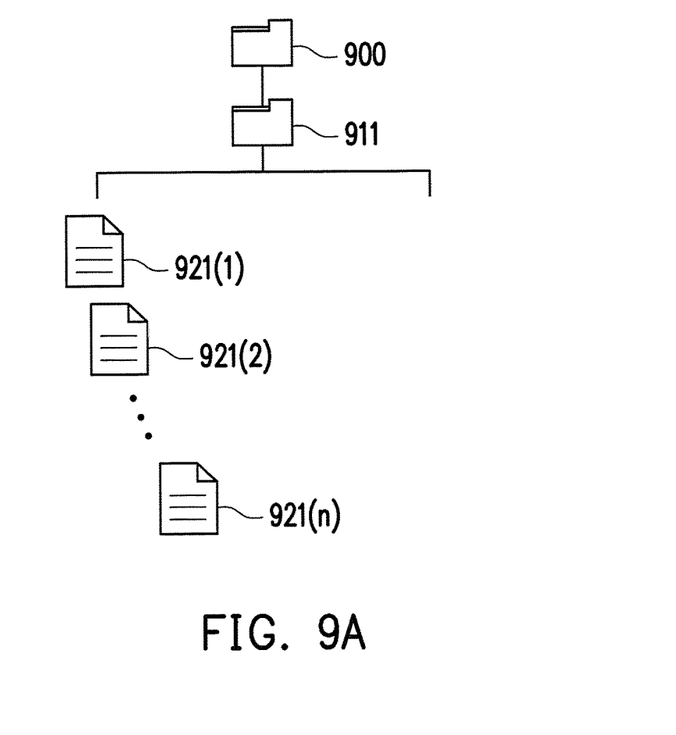
FIG. 9A illustrates an example of the first temporary file established in a root directory during a formatting process of the smart card chip according to an exemplary embodiment.
Figure 9B:
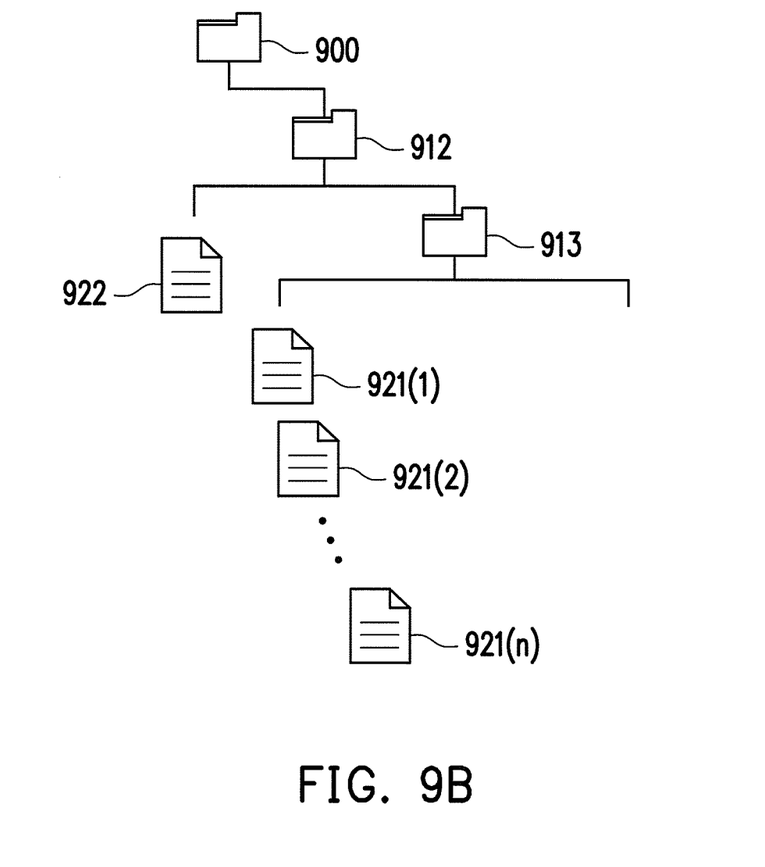
FIG. 9B illustrates an example of the first temporary file established in a temporary file directory according to an exemplary embodiment.

FIG. 8 is a flowchart illustrating a storage device management method according to an exemplary embodiment, FIG. 9A illustrates an example of the first temporary file established in a root directory during a formatting process of the smart card chip according to an exemplary embodiment, and FIG. 9B illustrates an example of the first temporary file established in a temporary file directory according to an exemplary embodiment.

Referring to FIG. 8, in step S805, when an initializing formatting process is executed by the memory storage device 10, the memory control circuit unit 404 (or the memory management circuit 502) establishes one first directory 911 in a root directory 900, and establishes a plurality of temporary files (also known as first temporary files) 921(1)~921(n) in the first directory 911. At this time, the memory storage device 10 has not yet received any setting instruction from the host 11.

Specifically, the first directory 911 is configured in the rewritable non-volatile memory module 406, and the first temporary files 921(1)~921(n) are stored in consecutive clusters 700(W−3), 700(W−2), 700(W−1) and 700(W) of the file system and cannot be deleted or modified. When the initializing formatting process is executed by the memory storage device 10, the memory control circuit unit 404 (or the memory management circuit 502) links a cluster number (e.g., a starting cluster number) of the first temporary files 921(1)~921(n) to the first directory 911 in the root directory 900. Accordingly, the first temporary files 921(1)~921(n) may be established in the first directory 910. Herein, the first temporary files 921(1)~921(n) may also correspond to logical units 610(D−127)~610(D).

It should be noted that, in Android 4.4.2 and later versions, the user is only able to access specific directories. That is to say, a specific application only has an access authority to directories established by the specific application itself. Therefore, in Android 4.4.2 and later versions, the application of the host 11 is unable to access the first temporary files 921(1)~921(n) in the first directory 911 in the root directory 900. That is to say, the access operation for the smart card chip 408 cannot be executed by accessing the logical units 610(D−127)~610(D) for the first temporary files 92 1(1)~921(n) to transmit a secure channel command.

In step S810, the memory control circuit unit 404 (or the memory management circuit 502) receives a setting instruction 630 from the host 11 to configure a temporary file directory 913 in a second directory 912.

Specifically, in the case where the operating system of the host 11 is Android 4.4.2 and later versions, the host 11 is unable to access the first temporary files 921(1)~921(n) located in the first directory 911 in the root directory 900. In this case, the smart card application 410 first scans whether the second directory 912 where the smart card application has the access authority to is stored with the first temporary files 921(1)~921(n). If the second directory 912 is not stored with the first temporary files 921(1)~921(n), the smart card application 410 first establishes a dynamic temporary file 922 (also known as a second temporary file 922) in the second directory 912. For example, the second temporary file 922 is stored in the cluster 700(W−50) corresponding to the logical unit 610(100). Next, the smart card application 410 transmits a write command that writes a data string 620 to the logical unit 610(100) and contains a header for configuring the first temporary files 921(1)~921(n) to the memory storage device 10, and the memory control circuit unit 404 (or the memory management circuit 502) identifies the write command corresponding to the data string 620 as a special command according to the logical address (i.e., the logical address 610(100)) instructed by the write command and the header thereof and obtains the setting instruction 630 that instructs to configure the temporary file directory 913 in the second directory 912 from the data string 620. In other words, the memory control circuit unit 404 (or the memory management circuit 502) may determine whether to configure the temporary file directory 913 in the second directory 912 or not according to information related to the logical unit 610(100) and the header thereof as contained in the write command.

Although the foregoing exemplary embodiment illustrates that the setting instruction 630 is issued by accessing the logical address of the dynamic temporary file 922, the present invention is not limited thereto. When the host 11 issues a general read/write command to the memory storage device 10 to access the rewritable non-volatile memory module 406, such read/write command may also include the setting instruction 630. In other words, the host 10 may configure the temporary file directory 913 in the second directory 912 and perform subsequent operations while accessing the rewritable non-volatile memory module 406 (instead of the smart card chip 408).

In step S815, the memory control circuit unit 404 (or the memory management circuit 502) links the starting cluster number for storing the first temporary files 921(1)~921(n) to the temporary file directory 913 according to the setting instruction 630. Specifically, the memory control circuit unit 404 (or the memory management circuit 502) links the starting cluster number 700(W−3) of the consecutive clusters 700(W−3)~700(W) storing the first temporary files 921(1)~921(n) in the directory area 706 of the file system to the temporary file directory 913 according to the setting instruction 630. Accordingly, the temporary file directory 913 is stored with the first temporary files 921(1)~921(n). Since the temporary file directory 913 is located in the second directory 912 established by the smart card application 410, the smart card application 410 has the access authority to the temporary file directory 913 and is able to execute the accessing operation for the smart card chip 408 by accessing the logical units 610(D−127)~610(D) corresponding to the first temporary files 920(1)~920(n) in the temporary file directory 913.

It should be noted that, after linking the starting cluster number 700(W−3) of the first temporary files 921(1)~921(n) to the temporary file directory 913 (i.e., after the temporary file directory 913 is stored with the first temporary files 921(1)~921(n)), the smart card application 410 may further transmit a delete command that instructs to delete the second temporary file 922 in the second directory 912 to the memory storage device 10. Further, in step S810, if the first temporary files 921(1)~921(n) may be scanned in the second directory 912, it indicates that said step S815 is already executed. In this case, the smart card application 410 may execute the accessing operation for the smart card chip 408 by directly accessing the logical units 610(D−127)~610(D) corresponding to the first temporary files 920(1)~920(n) in the temporary file directory 913 without establishing the second temporary file 922 in the second directory 912.

Figure 10:
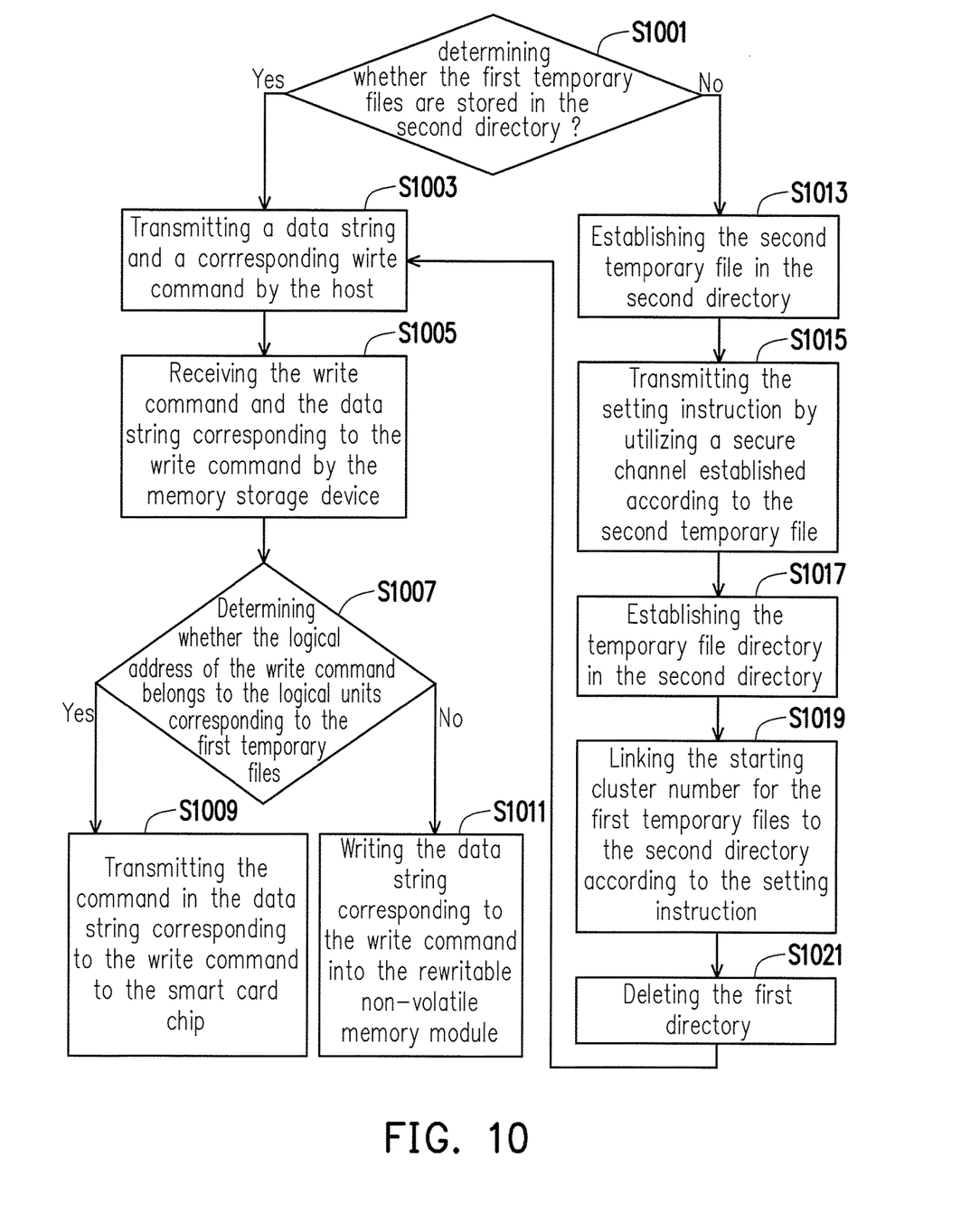
FIG. 10 is a detailed flowchart illustrating a storage device management method according to an exemplary embodiment.

FIG. 10 is a detailed flowchart illustrating a storage device management method according to an exemplary embodiment.

Referring to FIG. 10, when the smart card application 410 is executed to transmit commands to the smart card chip 408, the smart card application 410 determines whether the first temporary files 921(1)~921(n) are stored in the second directory 912 in step S1001.

If the second directory 912 is stored with the first temporary files 921(1)~921(n), the smart card application 410 transmits the data string containing the commands to be transmitted to the smart card chip 408 and the write command that instructs to write the data to the logical address belonging to the first temporary files 921(1)~921(n) (i.e., the clusters storing the first temporary files 921(1)~921(n)) to the memory storage device 10 in step S1003.

In step S1005, the memory control circuit unit 404 (or the memory management circuit 502) receives the write command and the data string corresponding to the write command from the smart card application 410 of the host 11.

In step S1007, the memory control circuit unit 404 (or the memory management circuit 502) determines whether the logical address of the write command belongs to the logical units 610(D−127)~610(D) corresponding to the first temporary files 921(1)~921(n).

If the logical address of the write command belongs to the logical units 610(D−127)~610(D) corresponding to the first temporary files 921(1)~921(n), the memory control circuit unit 404 (or the memory management circuit 502) transmits the command in the data string corresponding to the write command to the smart card chip 408 in step S1009.

If the logical address of the write command does not belong to the logical units 610(D−127)~610(D) corresponding to the first temporary files 921(1)~921(n), the memory control circuit unit 404 (or the memory management circuit 502) writes the data string of the write command into the rewritable non-volatile memory module 406 according to the logical address of the write command in step S1011.

If it is determined that the second directory 912 is not stored with the first temporary files 921(1)~921(n) in step S1001, the smart card application 410 establishes the second temporary file 922 in the second directory 912 and transmits the information related to the logical address (i.e., the cluster) for storing the second temporary file 922 to the memory control circuit unit 404 (or the memory management circuit 502) in step S1013.

Thereafter, in step S1015, the smart card application 410 transmits the setting instruction 630 that instructs to establish the temporary file directory 913 in the second directory 912 to the memory control circuit unit 404 (or the memory management circuit 502) by utilizing a secure channel established according to the second temporary file 922.

Next, in step S1017, the memory control circuit unit 404 (or the memory management circuit 502) establishes the temporary file directory 913 in the second directory 912 according to the setting instruction 630.

In step S1019, the memory control circuit unit 404 (or the memory management circuit 502) links the starting cluster number 700(W−3) of the consecutive clusters 700(W−3)~700(W) storing the first temporary files 921(1)~921(n) in the directory area 706 corresponding to the file system to the second directory 912 (as shown in FIG. 9B) according to the setting instruction 630.

Thereafter, in step S1021, the smart card application 410 transmits one delete command to delete the first directory 911. And then, step S1003 is executed.

It should be noted that, although the smart card application 410 has the access authority to the second directory 912, but because the first temporary files 921(1)~921(n) stored in the second directory 912 are located in the clusters 700(W−3)~700(W) of the file system, those clusters or the physical erasing units of the rewritable non-volatile memory module 406 corresponding to these clusters may be set to a undeletable state during the formatting process of the memory storage device 10. In that case, if the delete command that instructs to delete the first temporary files 921(1)~921(n) in the second directory 912 is received by the memory control circuit unit 404 (or the memory management circuit 502) from the smart card application 410 of the host 11, the memory control circuit unit 404 (or the memory management circuit 502) does not delete the first temporary files 921(1)~921(n) but transmits an error message to the host 11.

Figure 11A:
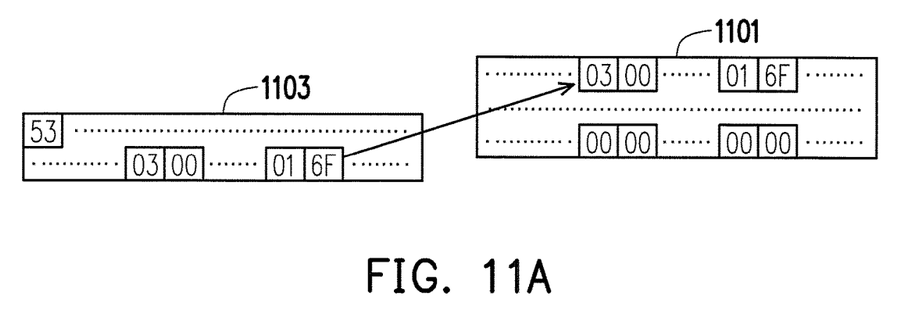
FIG. 11A to FIG. 11C are schematic diagrams illustrating an example of changes in the directory area when the first temporary files are established in the temporary file directory according to an exemplary embodiment.
Figure 11B:
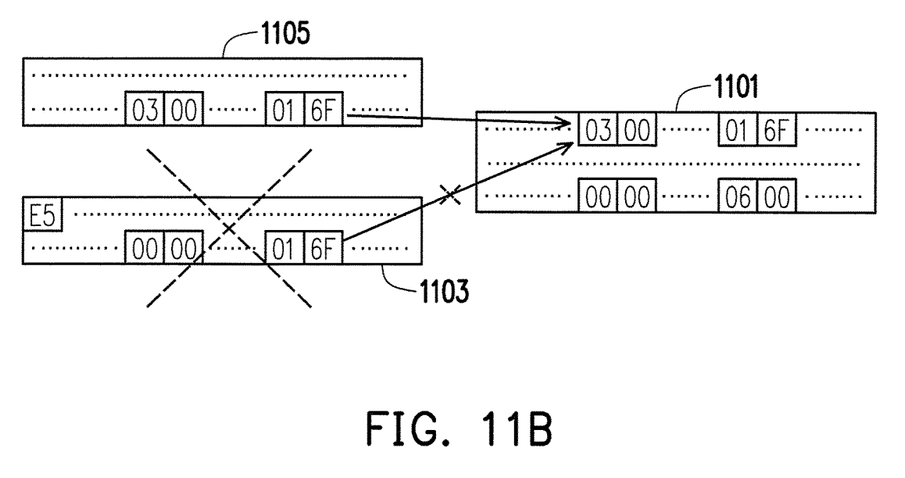
Figure 11C:
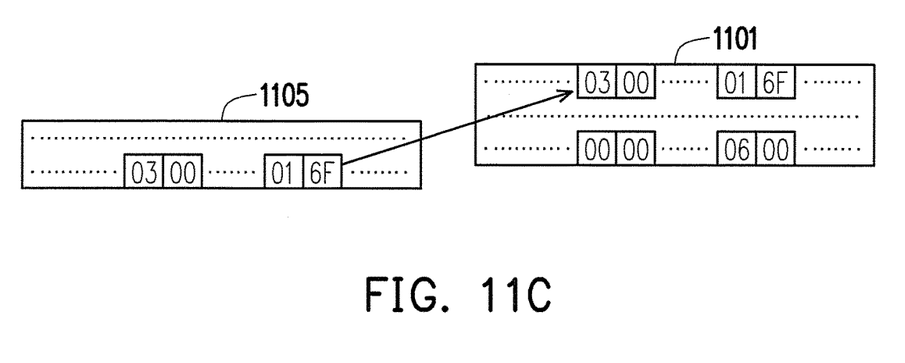

FIG. 11A to FIG. 11C are schematic diagrams illustrating an example of changes in the directory area when the first temporary files are established in the temporary file directory according to an exemplary embodiment.

Referring to FIG. 11A, during the initializing formatting process of the memory storage device 10, the starting cluster number (i.e., 0x00036F01) of the first temporary files 921(1)~921(*n*) recorded in a first temporary file directory area 1101 is linked to a root directory area 1103. At this time, the first temporary files 921(1)~921(*n*) are stored in the first directory 911 in the root directory 900, wherein the cluster number the first directory 911 is 0x00000000.

In FIG. 11B, after receiving the setting instruction 630 from the host 11 and configuring the temporary file directory 913 in the second directory 912 by the memory control circuit unit 404 (or the memory management circuit 502), the starting cluster number (i.e., 0x00036F01) of the first temporary files 921(1)~921(*n*) is linked to a second directory area 1105. At this time, the first temporary files 921(1)~921(*n*) are stored in the temporary file directory 913 in the second directory 912, wherein the cluster number the temporary file directory 913 is 0x00000006. Meanwhile, the original data corresponding to the starting cluster number of the first temporary files 921(1)~921(*n*) in the root directory area 1103 is changed, and a first byte thereof is set to E5. At this time, the first directory 911 in the root directory 900 is already deleted.

In FIG. 11C, because the starting cluster number for storing the first temporary files 921(1)~921(*n*) is successfully linked to the temporary file directory 913, the smart card application 410 of the host 11 may access the smart card chip 408 by accessing the logical addresses of the first temporary files 921(1)~921(*n*).

In summary, the present disclosure allows the host to correctly access the smart card chip when accessing the logical addresses of the first temporary files by linking the cluster number of the consecutive clusters of the first temporary files to the second directory which is accessible to the host. As such, even when the host accesses the data greater than the size of the clusters, because the clusters of first temporary files are consecutive, the issue where the data being incorrectly accessed may be prevented.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A storage device management method for a memory storage device having a rewritable non-volatile memory module and a smart card chip, the storage device management method comprising:

establishing a plurality of first temporary files in a first directory before receiving a setting instruction from a host, wherein the first temporary files are stored in a plurality of consecutive clusters of a file system corresponding to the memory storage device, and the first directory is configured in the rewritable non-volatile memory module and an operating system of the host is unable to access files in the first directory;

receiving the setting instruction from the host, wherein the setting instruction instructs to configure a temporary file directory in a second directory, and the second directory is configured in the rewritable non-volatile memory module and the operating system of the host is able to access files in the second directory; and linking a cluster number of the consecutive clusters storing the first temporary files which the host is unable to access to the temporary file directory which the host is able to access in the directory area corresponding to the file system for the host to access the smart card chip by accessing logical addresses of the first temporary files.

2. The storage device management method of claim 1, further comprising:

establishing a second temporary file in the second directory by a smart card application installed in the host, wherein the second temporary file is stored in a cluster of the file system; and issuing a write command for writing a data string to a first logical address to the memory storage device by the smart card application, wherein the data string contains the setting instruction and the first logical address corresponds to the cluster storing the second temporary file.

3. The storage device management method of claim 2, wherein the step of receiving the setting instruction from the host comprises:

identifying the data string containing the setting instruction according to the first logical address instructed by the write command, and obtaining the setting instruction from the data string.

4. The storage device management method of claim 2, further comprising:

scanning the second directory and determining whether the first temporary files are stored in the second directory by the smart card application, wherein the steps of establishing the second temporary file in the second directory by the smart card application installed in the host and issuing the write command that writes the data string to the first logical address to the memory storage device by the smart card application are executed when the second directory is not stored with the first temporary files.

5. The storage device management method of claim 1, further comprising:

transmitting a delete command to delete the first directory after linking the cluster number of the consecutive clusters storing the first temporary files to the second directory in the directory area corresponding to the file system.

6. The storage device management method of claim 1, wherein the host transmits a read/write command to read or write the memory storage device, and the read/write command comprises the setting instruction.

7. The storage device management method of claim 1, further comprising:

not deleting the first temporary files but transmitting an error message in response to the delete command that instructs to delete the first temporary files if a delete command instructing delete the first temporary files is received.

8. The storage device management method of claim 2, further comprising:

transmitting a delete command by the smart card application to delete the second temporary file after linking the cluster number of the consecutive clusters storing the first temporary files to the second directory in the directory area corresponding to the file system.

9. A memory storage device, comprising:
a connection interface unit configured to couple to a host;
a rewritable non-volatile memory module;
a smart card chip; and
a memory control circuit unit coupled to the connection interface unit, the rewritable non-volatile memory module and the smart card chip,
wherein the memory control circuit unit establishes a plurality of first temporary files in a first directory before receiving a setting instruction from the host, wherein the first temporary files are stored in a plurality of consecutive clusters of a file system corresponding to the memory storage device, and the first directory is configured in the rewritable non-volatile memory module and an operating system of the host is unable to access files in the first directory;
wherein the setting instruction instructs to configure a temporary file directory in a second directory, and the second directory is configured in the rewritable non-volatile memory module and the operating system of the host is able to access files in the second directory; and
wherein the memory control circuit unit linking a cluster number of the consecutive clusters storing the first temporary files which the host is unable to access to the temporary file directory which the host is able to access in the directory area corresponding to the file system for the host to access the smart card chip by accessing logical addresses of the first temporary files.

10. The memory storage device of claim 9, wherein the memory circuit management unit receives a write command from a smart card application installed in the host to establish a second temporary file in the second directory, wherein the second temporary file is stored in a cluster of the file system,
wherein the memory circuit management unit receives the write command from the smart card application to write a data string to a first logical address, wherein the data string contains the setting instruction and the first logical address corresponds to the cluster storing the second temporary file.

11. The memory storage device of claim 10, wherein the memory circuit management unit identifies the data string containing the setting instruction according to the first logical address instructed by the write command, and obtains the setting instruction from the data string.

12. The memory storage device of claim 10, wherein the memory circuit management unit receives a scanning signal from the smart card application to scan the second directory and determine whether the first temporary files are stored in the second directory,
wherein when the second directory is not stored with the first temporary files, the memory circuit management unit receives the write command from the smart card application installed in the host to establish the second temporary file in the second directory and receives the write command from the smart card application in order to write the data string to the first logical address.

13. The memory storage device of claim 9, wherein the memory circuit management unit receives a delete command from the host to delete the first directory after linking the cluster number of the consecutive clusters storing the first temporary files to the second directory in the directory area corresponding to the file system.

14. The memory storage device of claim 9, wherein the host transmits a read/write command to read or write the memory storage device, and the read/write command comprises the setting instruction.

15. The memory storage device of claim 9, wherein the memory circuit management unit does not delete the first temporary files but transmits an error message to the host in response to the delete command that instructs to delete the first temporary files if a delete command instructing to delete the first temporary files is received by the memory circuit management unit from the host.

16. The memory storage device of claim 10, wherein the memory management circuit receives a delete command from the smart card application to delete the second temporary file after linking the cluster number of the consecutive clusters storing the first temporary files to the second directory in the directory area corresponding to the file system.

17. A storage device management system, comprising:
a host; and
a memory storage device, having a rewritable non-volatile memory module and a smart card chip, and being detachably coupled to the host,
wherein the memory storage device establishes a plurality of first temporary files in a first directory before receiving a setting instruction from the host, wherein the first temporary files are stored in a plurality of consecutive clusters of a file system corresponding to the memory storage device, and the first directory is configured in the rewritable non-volatile memory module and an operating system of the host is unable to access files in the first directory;
wherein the setting instruction instructs to configure a temporary file directory in a second directory, and the second directory is configured in the rewritable non-volatile memory module and the operating system of the host is able to access files in the second directory; and
wherein the memory storage device linking a cluster number of the consecutive clusters storing the first temporary files which the host is unable to access to the temporary file directory which the host is able to access in the directory area corresponding to the file system for the host to access the smart card chip by accessing logical addresses of the first temporary files.

18. The storage device management system of claim 17, wherein the memory storage device receives a write command from a smart card application installed in the host to establish a second temporary file in the second directory, wherein the second temporary file is stored in a cluster of the file system,
wherein the memory storage device receives the write command from the smart card application to write a data string to a first logical address, wherein the data string contains the setting instruction and the first logical address corresponds to the cluster storing the second temporary file.

19. The storage device management system of claim 18, wherein the memory storage device identifies the data string containing the setting instruction according to the first logical address instructed by the write command, and obtains the setting instruction from the data string.

20. The storage device management system of claim 18, wherein the memory storage device receives a scanning signal from the smart card application to scan the second directory and determine whether the first temporary files are stored in the second directory, wherein when the second directory is not stored with the first temporary files, the memory storage device receives the write command from the smart card application installed in the host to establish the second temporary file in the second directory and receives the write command from the smart card application to write the data string to the first logical address.

21. The storage device management system of claim 17, wherein the memory storage device receives a delete command from the host to delete the first directory after linking the cluster number of the consecutive clusters storing the first temporary files to the second directory in the directory area corresponding to the file system.

22. The storage device management system of claim 17, wherein the host transmits a read/write command to read or write the memory storage device, and the read/write command comprises the setting instruction.

23. The storage device management system of claim 17, wherein the memory storage device does not delete the first temporary files but transmits an error message to the host in response to the delete command that instructs to delete the first temporary files if a delete command that instructs to delete the first temporary files is received by the memory storage device from the host.

24. The storage device management system of claim 18, wherein the memory storage device receives a delete command from the smart card application to delete the second temporary file after linking the cluster number of the consecutive clusters storing the first temporary files to the second directory in the directory area corresponding to the file system.

* * * * *